US012664424B2

(12) United States Patent
Yuan et al.

(10) Patent No.: US 12,664,424 B2
(45) Date of Patent: Jun. 23, 2026

(54) CONTRASTIVE LEARNING BY DYNAMICALLY SELECTING DROPOUT RATIOS AND LOCATIONS BASED ON REINFORCEMENT LEARNING

(71) Applicant: INTERNATIONAL BUSINESS MACHINES CORPORATION, Armonk, NY (US)

(72) Inventors: Zhong Fang Yuan, Xi'an (CN); Si Tong Zhao, Beijing (CN); Tong Liu, Xi'An (CN); Yi Chen Zhong, Shanghai (CN); Yuan Yuan Ding, Shanghai (CN); Hai Bo Zou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 801 days.

(21) Appl. No.: 17/955,055

(22) Filed: Sep. 28, 2022

(65) Prior Publication Data

US 2024/0119275 A1     Apr. 11, 2024

(51) Int. Cl.
*G06N 3/08* (2023.01)
*G06N 3/047* (2023.01)

(52) U.S. Cl.
CPC .............. *G06N 3/08* (2013.01); *G06N 3/047* (2023.01)

(58) Field of Classification Search
CPC ........ G06N 3/08; G06N 3/0464; G06N 3/045; G06N 3/042; G06N 3/092; G06N 3/02; G06N 20/00
See application file for complete search history.

(56) References Cited

U.S. PATENT DOCUMENTS

| | | | |
|---|---|---|---|
| 10,839,260 B1 | 11/2020 | Khanna | |
| 2021/0279511 A1* | 9/2021 | Gordon | G06V 10/774 |
| 2022/0156585 A1* | 5/2022 | Leng | G06N 3/082 |
| 2022/0179419 A1* | 6/2022 | Romeres | G06N 3/092 |

(Continued)

FOREIGN PATENT DOCUMENTS

| | | |
|---|---|---|
| KR | 102061615 B1 | 1/2020 |
| WO | 20202205441 W | 11/2020 |

OTHER PUBLICATIONS

Huang, et al., "A Two-Stage Contrastive Learning Framework For Imbalanced Aerial Scene Recognition," ICASSP 2002, 2022 IEEE International Conference on Acoustics, Speech and Signal Processing (ICASSP) 978-1-6654-0540-9/22, pp. 3518-3522.

(Continued)

*Primary Examiner* — Jason Salce
(74) *Attorney, Agent, or Firm* — Steven M. Bouknight

(57)        ABSTRACT

A method for contrastive learning by selecting dropout ratios and locations based on reinforcement learning includes receiving training data having a positive sample corresponding to a target and negative samples not corresponding to the target. A dropout policy for a neural network is produced based on the training data, where the dropout policy identifies at least one connection between neurons in the neural network to dropout. The training data is encoded, based on the dropout policy, to form embeddings, where the embeddings include multiple positive sample embeddings corresponding to the positive sample and multiple negative sample embedding corresponding to the negative samples.

17 Claims, 10 Drawing Sheets

(56)                    References Cited

U.S. PATENT DOCUMENTS

2022/0309774 A1 *   9/2022  Uzkent  ............... G06V 10/764

OTHER PUBLICATIONS

Pham, et al., "AutoDropout: Learning Dropout Patterns to Regularize Deep Networks," Association for the Advancement of Artificial Intelligence (www.aaai.org), arXiv:2101.01761v1, [cs.LG] Jan. 5, 2021, 15 pages.
Wu, et al., "BlockDrop: Dynamic Inference Paths in Residual Networks," Proceedings / CVPR, IEEE Computer Society Conference on Computer Vision and Pattern Recognition. IEEE Computer Society Conference on Computer Vision and Pattern Recognition · Jan. 2018, 12 pages.
Srinivas, et al., "CURL: Contrastive Unsupervised Representations for Reinforcement Learning," Proceedings of the 37th International Conference on Machine Learning, Vienna, Austria, PMLR 119, 2020, arXiv:2004.04136v4 [cs.LG] Sep. 21, 2020, 20 pages.
Gao, et al., "SimCSE: Simple Contrastive Learning of Sentence Embeddings," arXiv:2104.08821v4 [cs.CL] May 18, 2022, 17 pages.
Ghiasi et al., "DropBlock: A regularization method for convolutional networks", 32nd Conference on Neural Information Processing Systems NeurIPS, Oct. 30, 2018, 11 pages.
Srivastava et al., "Dropout: A Simple Way to Prevent Neural Networks from Overfitting", Journal of Machine Learning Research 15, Jan. 1, 2014, pp. 1929-1958.
Tompson et al. "Efficient Object Localization Using Convolutional Networks", arXiv: 1411.4280v3 [cs.CV], Jun. 9, 2015, 9 pages.

* cited by examiner

300

| | 321 | 322 | 323 | 324 |
|---|---|---|---|---|
| 311 | 0 | 1 | 0 | 1 |
| 312 | 0 | 1 | 0 | 1 |
| 313 | 0 | 1 | 0 | 1 |
| 314 | 0 | 1 | 0 | 1 |

400

500

600

900

CONTRASTIVE LEARNING BY DYNAMICALLY SELECTING DROPOUT RATIOS AND LOCATIONS BASED ON REINFORCEMENT LEARNING

BACKGROUND

The present disclosure relates generally to reinforcement learning and, more particularly, to contrastive learning by dynamically selecting dropout ratios and locations based on reinforcement learning.

A contrastive learning model may be used to classify input data (e.g., image, text, audio, etc.). For instance, a contrastive learning model may be used to determine whether input data corresponds a target. In one approach, a contrastive learning model is trained using a loss function and a set of training data that includes positive samples that correspond to the target and negative samples that do not correspond to the target. The loss function minimizes distances between the positive samples and maximizes distances between the negative samples. Once the contrastive learning model is trained, it may be used to classify input data.

SUMMARY

A method for contrastive learning by selecting dropout ratios and locations based on reinforcement learning is disclosed. The method includes receiving training data having a positive sample corresponding to a target and negative samples not corresponding to the target. A dropout policy for a neural network is produced based on the training data, where the dropout policy identifies at least one connection between neurons in the neural network to dropout. The training data is encoded, based on the dropout policy, to form embeddings, where the embeddings include multiple positive sample embeddings corresponding to the positive sample and multiple negative sample embedding corresponding to the negative samples.

A system for contrastive learning by selecting dropout ratios and locations based on reinforcement learning is disclosed. The system includes a non-transitory computer-readable storage memory configured to store instructions and a processor coupled to the non-transitory computer-readable storage memory. The processor is configured to execute the instructions to cause the system to receive training data having a positive sample corresponding to a target and negative samples not corresponding to the target, produce, based on the training data, a dropout policy for a neural network, where the dropout policy identifies at least one connection between neurons in the neural network to dropout, and encode, based on the dropout policy, the training data to form embeddings, where the embeddings include multiple positive sample embeddings corresponding to the positive sample and multiple negative sample embedding corresponding to the negative samples.

A computer program product for contrastive learning by selecting dropout ratios and locations based on reinforcement learning is disclosed. The computer program product includes instructions stored on a non-transitory computer-readable medium. When the instructions are executed by a processor, the instructions cause a system to receive training data having a positive sample corresponding to a target and negative samples not corresponding to the target, produce, based on the training data, a dropout policy for a neural network, where the dropout policy identifies at least one connection between neurons in the neural network to dropout, and encode, based on the dropout policy, the training data to form embeddings, where the embeddings include multiple positive sample embeddings corresponding to the positive sample and multiple negative sample embedding corresponding to the negative samples.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
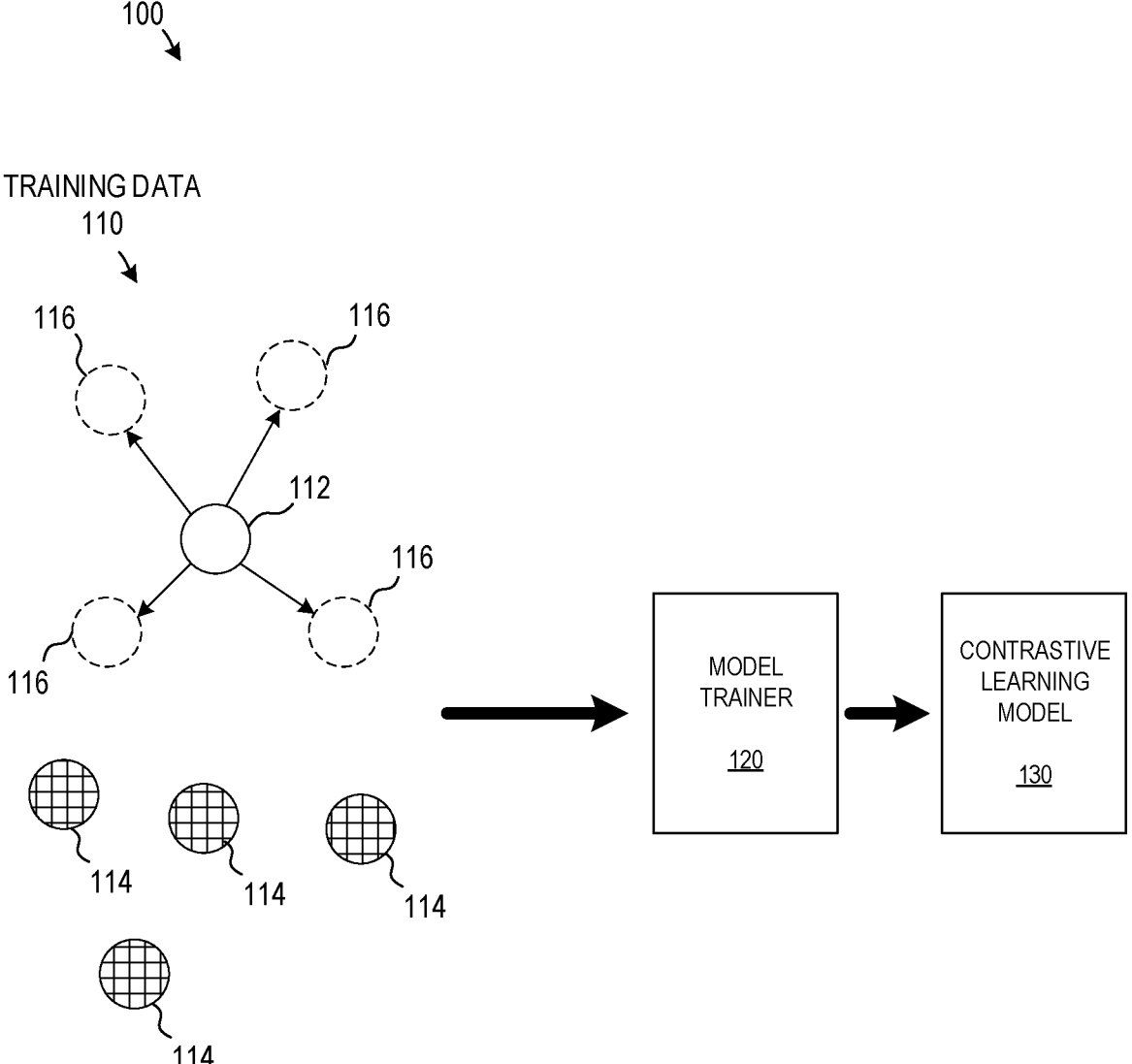
FIG. 1 is a block diagram illustration of a system for training a contrastive learning model in accordance with aspects of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" (and inflections thereof) are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

A "module" or "unit" (and inflections thereof) as referenced herein comprises one or more hardware or electrical components such as electrical circuitry, processors, and memory that may be specially configured to perform a particular function. The memory may comprise volatile memory or non-volatile memory that stores data such as, but not limited to, computer executable instructions, machine code, and other various forms of data. The module or unit may be configured to use the data to execute one or more instructions to perform one or more tasks. In certain instances, a module or unit may also refer to a particular set of functions, software instructions, or circuitry that is configured to perform a specific task. For example, a module or unit may comprise software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicate" (and inflections thereof) means to receive and/or transmit data or information over a communication link. The communication link may include both wired and wireless links, and may comprise a direct link or may comprise multiple links passing through one or more communication networks or network devices such as, but not limited to, routers, firewalls, servers, and switches. The communication networks may comprise any type of wired or wireless network. The networks may include private networks and/or public networks such as the Internet. Additionally, in some embodiments, the term communicate may also encompass internal communication between various components of a system and/or with an external input/output device such as a keyboard or display device.

A contrastive learning model may be trained using embeddings. Embeddings represent data (e.g., text data, image data, audio data, etc.) as vectors of continuous numbers that may be processed by the contrastive learning model. The embeddings include positive sample embeddings corresponding to a target and negative sample embedding not corresponding to the target. In at least some other approaches, positive sample embeddings may be generated from an original positive sample embedding by randomly dropping neurons in a neural network used to produce the original positive sample embedding. However, important information (e.g., information about important features useful for classifying input data) may be missing from the positive sample embeddings, because portions of the original positive sample embedding are randomly removed. Thus, the important information may not be used in training the contrastive learning model, and the performance of the contrastive learning model in performing classification may be degraded. Additionally, the contrastive learning model may be unstable, because it is trained using randomly generated positive sample embeddings.

In an embodiment of the present disclosure, positive sample embeddings are generated based on a dropout policy.

The dropout policy may indicate specific neuron connections to drop when producing the positive sample embeddings. The dropout policy may be selected based on a reinforcement learning method that maximizes a loss function. Additionally, the dropout policy may be selected based on short-term rewards calculated using candidate dropout policies from a policy network and long-term rewards from a Monte Carlo search tree. Accordingly, performance of a contrastive learning model may be improved by training the contrastive learning model with positive sample embeddings produced using a dropout policy instead of training the contrastive learning model with positive sample embeddings produced by randomly dropping neurons.

FIG. 1 is a block diagram illustration of a system 100 for training a contrastive learning model 130. They system 100 includes training data 110 that is input to a model trainer 120 to train the contrastive learning model 130. In one embodiment, the training data 110 is in the form of embeddings. An embedding represents data as a vector of continuous numbers that can be processed by the model trainer 120. For instance, data may include image, text, or audio information. An encoder may apply a function to the data to produce a vector that includes a set of continuous numbers that represents the data. For example, an encoder may apply a function to an image to produce a vector of ten continuous numbers that represent the image. Some examples of encoders include principal component analysis (PCA), singular value decomposition (SVD), word to vector (word2vec), and bidirectional encoder representations of transformers (BERT). However, embodiments are not limited to any particular method of producing embeddings and include embeddings produced using any method.

The training data 110 includes a positive sample embedding 112 and negative sample embeddings 114. In one embodiment, the positive sample embedding 112 corresponds to a target that the contrastive learning model 130 is being trained to classify and the negative sample embeddings 114 do not correspond to the target. For instance, if the system 100 is being used to train the contrastive learning model 130 to determine whether an image includes a person, the positive sample embedding 112 corresponds to an image that includes a person, and the negative sample embeddings 114 do not correspond to images that include a person.

The training data 110 also includes dropout positive sampling embeddings 116. As explained below, the dropout positive sampling embeddings 116 may be produced using the same input data used to produce the positive sampling embedding 112. However, when producing the dropout sampling embeddings 116, a dropout process is used to produce different embeddings (e.g., vectors) representing the input data. Accordingly, the model trainer 120 uses the positive sample embedding 112 and the dropout positive sample embeddings 116 as positive samples when training the contrastive learning model 130 and uses the negative sample embeddings 114 as negative samples when training the contrastive learning model 130.

Figure 2:
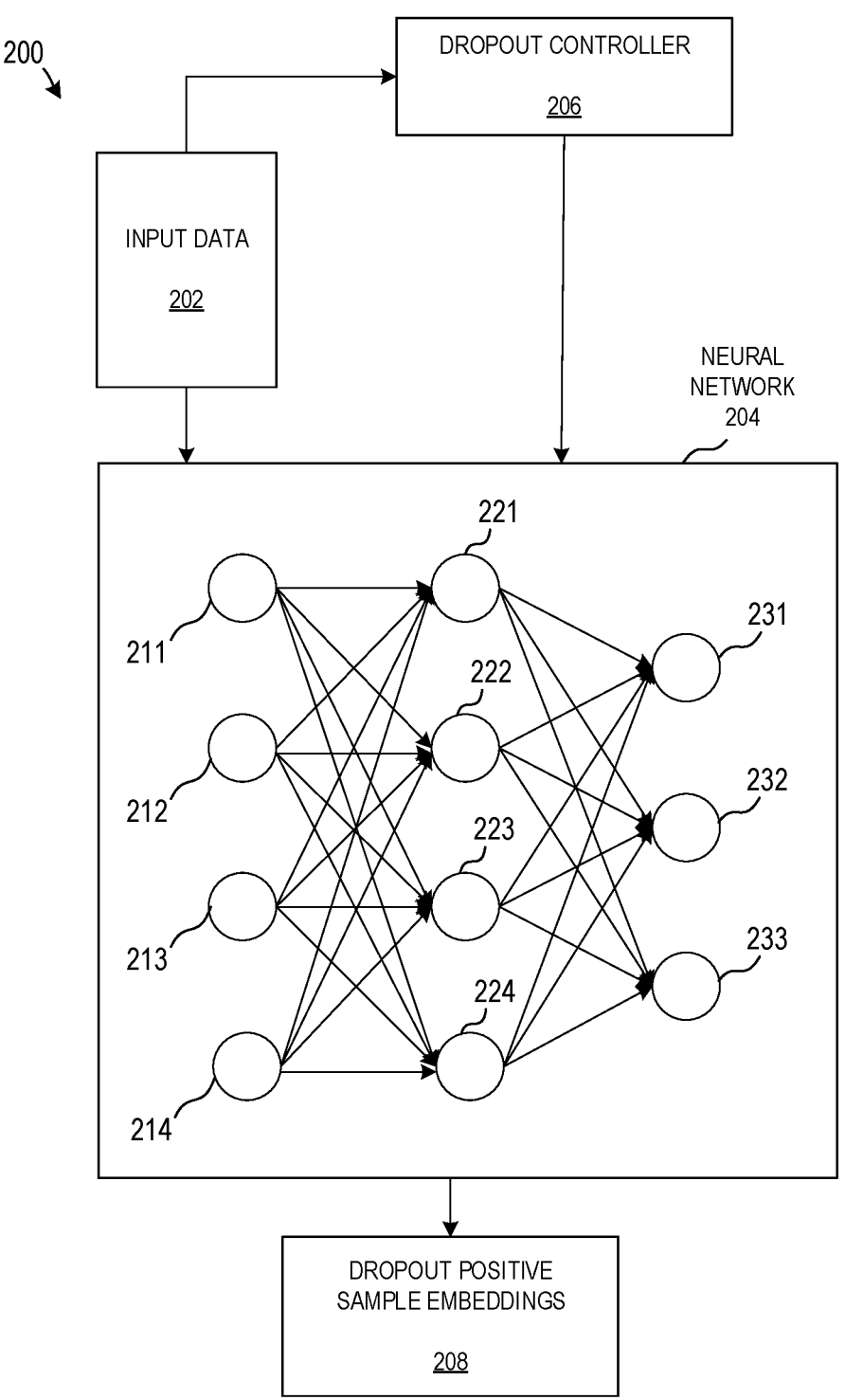
FIG. 2 is a block diagram illustration of a system for producing positive sample embeddings in accordance with aspects of the present disclosure.

FIG. 2 is a block diagram illustration of a system 200 for producing dropout positive sample embeddings 208 (e.g., the dropout positive sample embeddings 116 in FIG. 1). The system 200 includes input data 202. The input data 202 may be of any form (e.g., image, text, audio, etc.) and may correspond to a target. The input data 202 is used by a neural network 204 and a dropout controller 206 to produce the dropout positive sample embeddings 208.

The neural network 204 includes an input layer with neurons 211, 212, 213, and 214, a hidden layer with neurons 221, 222, 223, and 224, and an output layer with neurons 231, 232, 233, and 234. As shown by the lines between the neurons, each neuron 211, 212, 213, and 214 in the input layer has a connection to each neuron 221, 222, 223, and 224 in the hidden layer, and each neuron 221, 222, 223, and 224 in the hidden layer has a connection to each neuron 231, 232, 233, and 234 in the output layer. For instance, the neuron 211 in the input layer has connections to neurons 221, 222, 223, and 224 in the hidden layer. Additionally, it should be noted that the example of the neural network 204 shown in FIG. 2 is given for illustration purposes only. Embodiments are not limited to any specific configuration of the neural network 204, and the neural network 204 may include any number of layers (e.g., any number of hidden layers) and may include any number of neurons in each layer.

The dropout controller 206 receives the input data 202 and uses the input data 202 to control the connections between the neurons in the neural network 204. In one embodiment, the dropout controller 206 may determine whether each connection between neurons in the neural network 204 is connected or disconnected. For example, the neuron 211 in the neural network 204 has connections to the neurons 221, 222, 223, and 224. The dropout controller 206 may determine whether to disconnect any one or more of those connections between the neuron 211 and the neurons 221, 222, 223, and 224. The process of disconnecting connections to neurons in the neural network 204 may be referred to as dropout.

To produce the dropout positive sampling embeddings 208, the neural network 204 processes the input data 202 using different neuron connection settings from the dropout controller 206. The neuron connection settings may be referred to as a dropout policy. A dropout policy may indicate a dropout ratio (e.g., a ratio of a number of neuron connections to disconnect to a total number of neuron connections), a number of neuron connections to disconnect, identifiers of neuron connections to disconnect, and/or locations of neuron connections to disconnect (e.g., a location may be indicated by identifiers of a specific layer, a specific row, a specific column, etc.). The dropout controller 206 may produce any number of dropout policies. Accordingly, the neural network 204 is able to process the input data 202 with different dropout polices to produce different dropout positive sampling embeddings 208 that each corresponds to the same input data 202. For example, the dropout controller 206 may produce five dropout polices that each identifies different neuron connections to be disconnected. The neural network 204 processes the input data 202 using the five dropout policies to produce five dropout positive sampling embeddings 208 that each corresponds to the same input data 202.

Figure 3:
FIG. 3 is a block diagram illustration of a dropout matrix representing neuron connections between an input layer and a hidden layer in a neural network in accordance with aspects of the present disclosure.

FIG. 3 is a block diagram illustration of a dropout matrix 300 representing neuron connections between the input layer and the hidden layer in the neural network 204 in FIG. 2. The dropout matrix 300 includes four rows 311, 312, 313, and 314 respectively corresponding to the four neurons 211, 212, 213, and 214 in the input layer of the neural network 204, and the dropout matrix 300 includes four columns 321, 322, 323, and 324 respectively corresponding to the four neurons 321, 322, 323, and 324 in the hidden layer of the neural network 204. Each connection between one of the neurons 211, 212, 213, and 214 in the input layer and one of the neurons 221, 222, 223, and 224 in the hidden layer is represented by one of the elements in the dropout matrix 300. For instance, the connection between the neuron 211 and the neuron 221 in neural network 204 is represented by the element corresponding to row 311 and column 321. Similarly, the connection between the neuron 211 and the neuron 222 in the neural network 204 is represented by the element corresponding to row 311 and column 322. Each element in the dropout matrix 300 has a value that represents whether the corresponding neuron connection is connected or disconnected. In the specific example shown in FIG. 3, a "1" may represent that a neuron connection is connected, and a "0" may represent that a neuron connection is disconnected. However, embodiments are not limited to any specific manner of representing whether a neuron connection is connected or disconnected.

Figure 4:
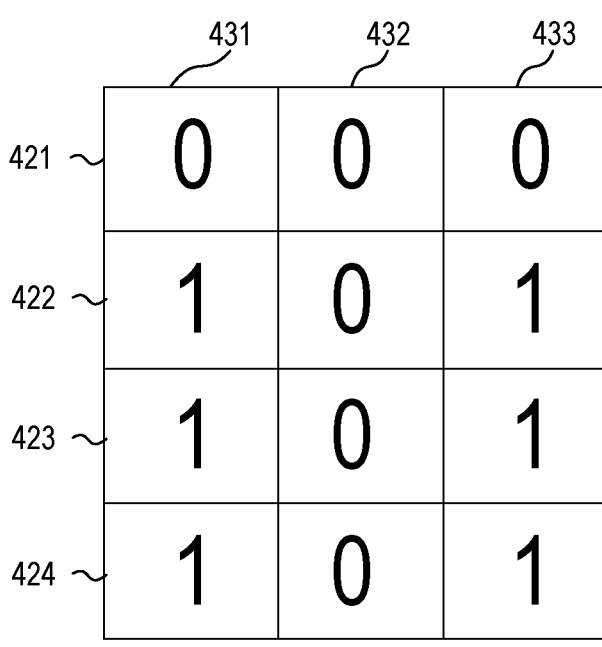
FIG. 4 is a block diagram illustration of a dropout matrix representing neuron connections between a hidden layer and an output layer in a neural network in accordance with aspects of the present disclosure.

FIG. 4 is a block diagram illustration of a dropout matrix 400 representing neuron connections between the hidden layer and the output layer in the neural network 204 in FIG. 2. The dropout matrix 400 includes four rows 421, 422, 423, and 424 respectively corresponding to the four neurons 221, 222, 223, and 224 in the hidden layer of the neural network 204, and the dropout matrix 400 includes three columns 431, 432, and 433 respectively corresponding to the three neurons 231, 232, and 233 in the output layer of the neural network 204. Each connection between one of the neurons 221, 222, 223, and 224 in the hidden layer and one of the neurons 231, 232, and 233 in the output layer is represented by one of the elements in the dropout matrix 400. For instance, the connection between the neuron 221 and the neuron 231 in the neural network 204 is represented by the element corresponding to row 421 and column 431. Similarly, the connection between the neuron 221 and the neuron 232 is represented by the element corresponding to row 421 and column 432. Similar to the dropout matrix 300 in FIG. 3, each element in the dropout matrix 400 has a value that represents whether the corresponding neuron connection is connected or disconnected. In the specific example shown in FIG. 4, a "1" may represent that a neuron connection is connected, and a "0" may represent that a neuron connection is disconnected. However, embodiments are not limited to any specific manner of representing whether a neuron connection is connected or disconnected.

Although the dropout matrix 300 in FIG. 3 is shown as being a four by four matrix and the dropout matrix 400 in FIG. 4 is shown as being a four by three matrix, embodiments of dropout matrices are not limited to any particular dimensions and may include any number of dimensions needed to represent connections between neurons in different layers of a neural network. For instance, if a neural network has fifty neurons in each layer, a dropout matrix may have fifty rows and fifty columns. Additionally, a neural network may have any number of matrices needed to represent the connections between its neurons. In one embodiment, if a neural network has N layers with N representing any number, the connections between the neurons in the neural network may be represented by N–1 matrices.

Figure 5:
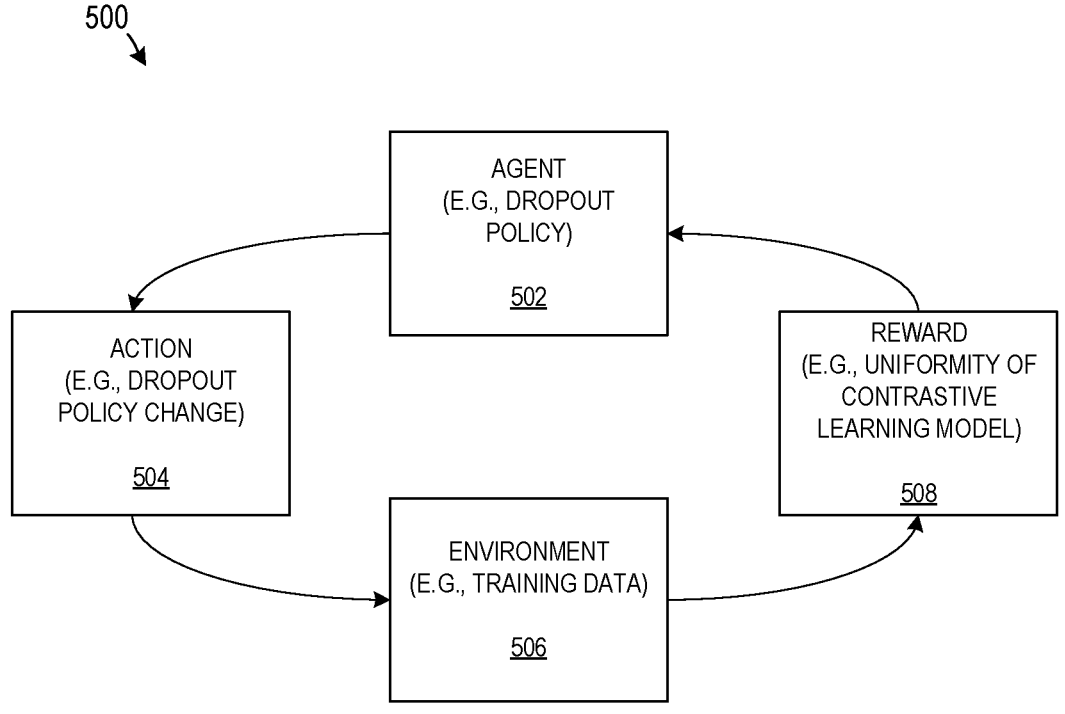
FIG. 5 is a block diagram illustration of a reinforcement learning method for producing a dropout policy in accordance with aspects of the present disclosure.

FIG. 5 is a block diagram illustration of a reinforcement learning method 500 for producing a dropout policy. The reinforcement learning method 500 includes an agent 502 performing an action 504 in an environment 506 to receive a reward 508. The reinforcement learning method 500 may be used by the agent 502 to learn which actions 504 to take to maximize the reward 508. In one embodiment, the agent 502 includes a dropout policy indicating how many neuron connections to disconnect and the locations of the connections to disconnect. The action 504 includes changes to the dropout policy such as, but not limited to, increasing or decreasing a number of neuron connections to disconnect and specifying the locations of the connections. The environment 506 includes the training data and the training process. After the agent 502 performs the action 504 in the environment 506, the reinforcement learning method 500 calculates the corresponding reward 508. In one embodiment, the reward 508 is calculated using a loss function such as, but not limited to, an information noise-contrastive estimation (infoNCE) loss function. The infoNCE loss function may be of the form of Equation 1.

$$\mathcal{L}_K = -\log\left(\frac{e^{f(x^+,c)}}{e^{f(x^+,c)} + \sum_{i=1}^{K} e^{f(x_i^-,c)}}\right). \qquad \text{Equation 1}$$

In Equation 1, "$\mathcal{L}_K$" is the infoNCE loss function, "f" is a relevance function, "$(x^+, c)$" is a positive sample, $$"(x_i^-, c)"$$

is a negative sample, and "K" is a number of negative samples associated with the positive sample. The reinforcement learning method 500 selects actions 504 that maximize the reward 508 to determine the dropout policy.

Figure 6:
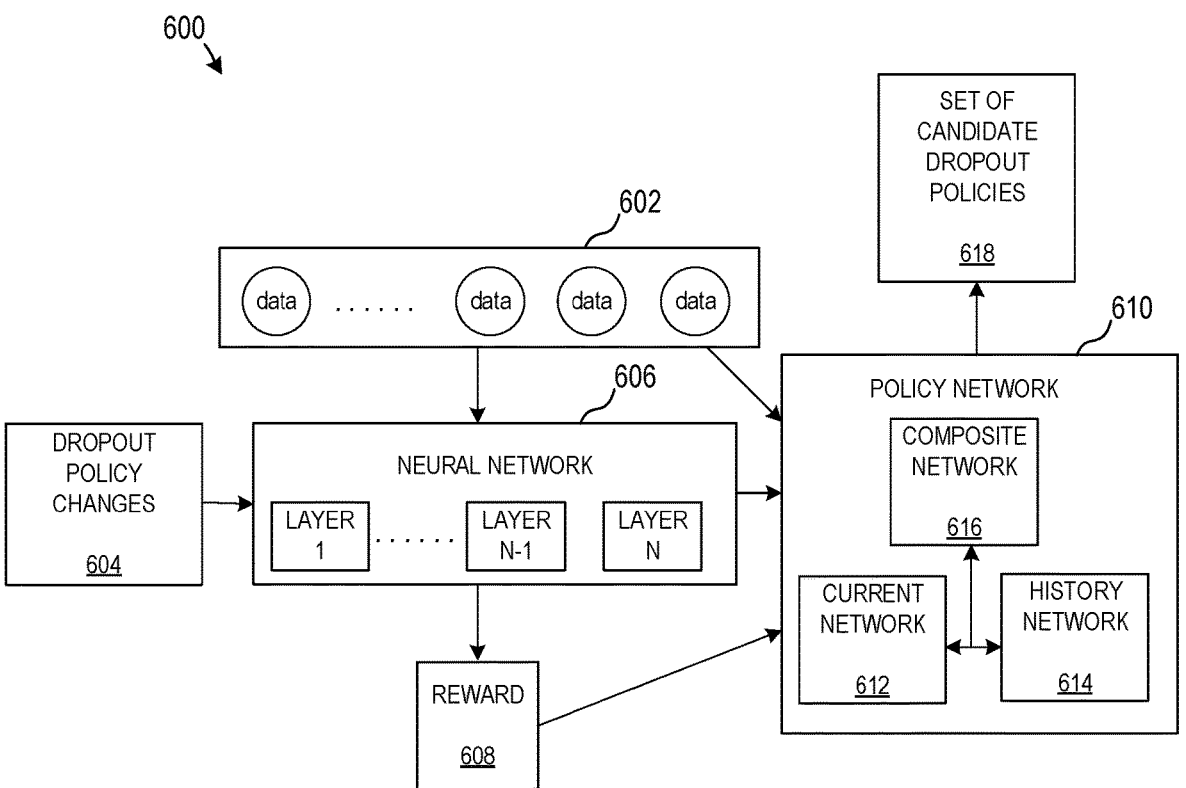
FIG. 6 is a block diagram illustration of a system for producing a set of candidate dropout polices using a policy network in accordance with aspects of the present disclosure.

FIG. 6 is a block diagram illustration of a system 600 for producing a set of candidate dropout policies 618. The system 600 includes data 602 and dropout policy changes 604 that are input to a neural network 606. The data 602 may include training data with one or more positive samples and one or more negative samples. The dropout policy changes 604 include dropout information (e.g., a dropout ratio, a number of neuron connections to disconnect, identifiers of neuron connections to disconnect, and/or locations of neuron connections to disconnect). The neural network 606 has N layers with N representing any number. Based on the data 602 and the dropout policy changes 604, the system 600 calculates a reward 608. The reward 608 may be calculated using the infoNCE loss function from Equation 1 or another loss function. The data 602 and the reward 608 are input to a policy network 610.

In one embodiment, the policy network 610 includes three transformer networks. The three transform networks include a current network 612, a history network 614, and a composite network 616. The current network 612 includes parameter information for a current network (e.g., dropout information and reward information of the current network), and the history network 614 includes parameter information from previous networks (e.g., dropout information and reward information from previous networks). The policy network 610 merges the current network 612 and the history network 614 to produce the composite network 616. Accordingly, by using the composite network 616, the policy network 610 is able to use information from both the current network and previous network to produce the set of candidate dropout policies 618. Each candidate dropout policy in the set of candidate dropout policies 618 may indicate a combination of possible actions for performing dropout on the neural network 606. Additionally, after a final set of parameters are selected for the neural network 606, the history network 614 may be updated with the final set of parameters.

Figure 7:
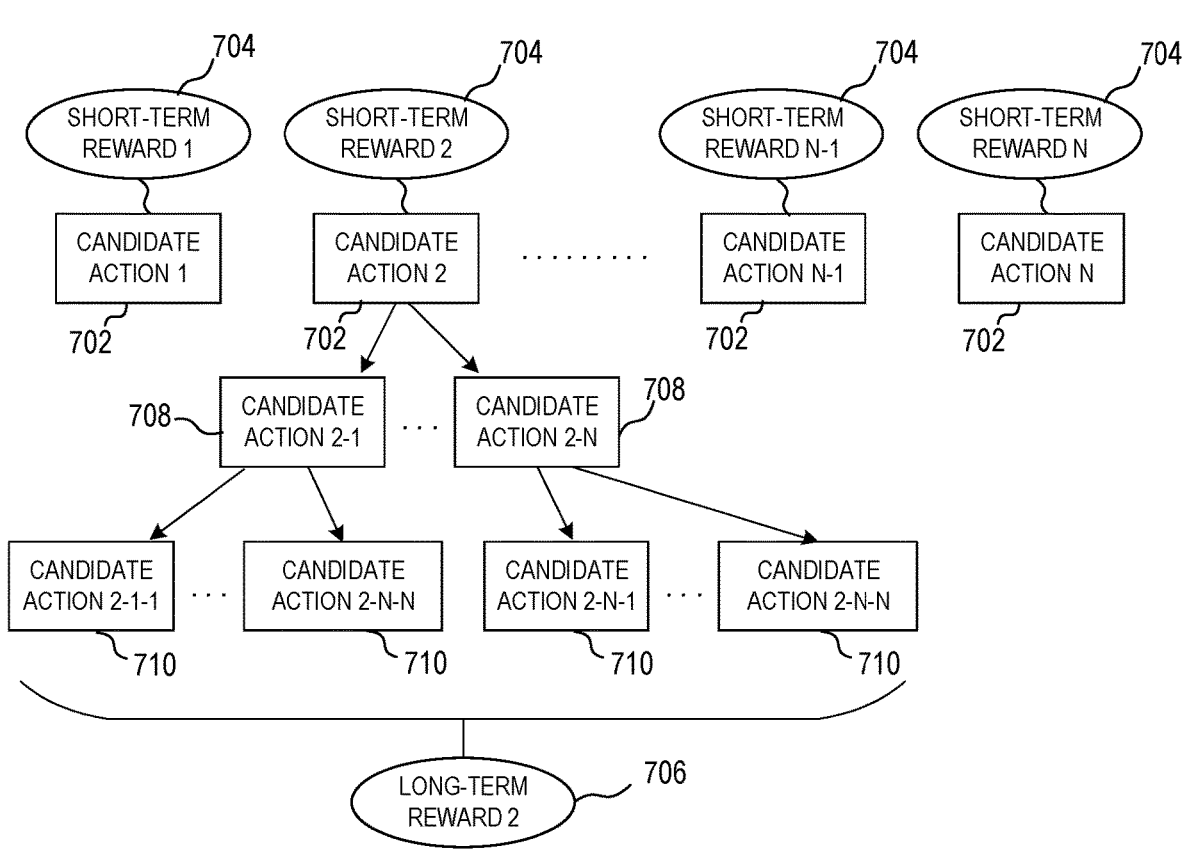
FIG. 7 is a block diagram illustration of a Monte Carlo search tree for selecting a dropout policy in accordance with aspects of the present disclosure.

FIG. 7 is a block diagram illustration of a Monte Carlo search tree 700 for selecting a dropout policy. The input to the Monte Carlo search tree 700 may be a set of candidate dropout policies (e.g., the set of candidate dropout policies 618 in FIG. 6). For each candidate dropout policy, a short-term reward 704 is calculated using a first action 702 in the candidate dropout policy. The short-term reward 704 may be calculated using the infoNCE loss function from Equation 1 or another loss function.

After the short-term rewards 704 are calculated for the first actions 702 in the candidate dropout policies, a top portion of the candidate dropout policies is selected. For example, the top three candidate dropout policies may be selected based on the short-term rewards 704 (e.g., the three candidate dropout policies having the greatest short-term rewards 704 may be selected).

After the top portion of the candidate dropout policies is selected, a long-term reward 706 is calculated using the first action 702 and additional actions for each dropout policy in the top portion of the candidate dropout policies. For example, each dropout policy in the top portion of the candidate dropout policies may have a number of possible first actions 702, a number of possible second actions 708, and a number of possible third actions 710. The long-term reward 706 is calculated based on the first actions 702, the second actions 708, and the third actions 710. The long-term reward 706 may be calculated using the infoNCE loss function from Equation 1 or another loss function. After the long-term rewards 706 are calculated for each dropout policy in the top portion of the candidate dropout policies, the dropout policy having the greatest long-term reward 706 is selected. Accordingly, the Monte Carlo search tree 700 first uses the short-term rewards 704 to select a top portion of the candidate dropout policies. Then, the Monte Carlo search tree 700 uses the long-term rewards 706 to select a final dropout policy from the top portion of the candidate dropout policies. The final dropout policy may be synchronized to a history network (e.g., the history network 614 in FIG. 6), and the final dropout policy may be used to train a contrastive learning model.

Figure 8:
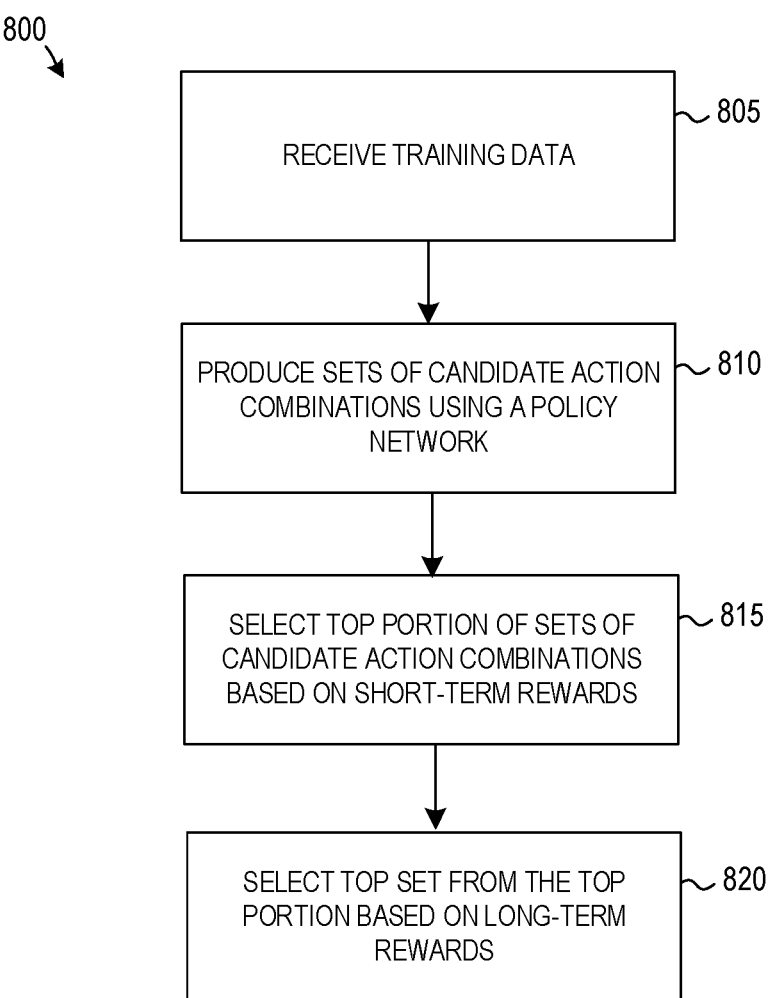
FIG. 8 is a flowchart illustration of a method for selecting a dropout policy based on reinforcement learning in accordance with aspects of the present disclosure.

FIG. 8 is a flowchart illustration of a method 800 for selecting a dropout policy based on reinforcement learning. At block 805, training data is received that includes one or more positive samples that correspond to a target and negative samples that do not correspond to the target. At block 810, a set of candidate dropout policies is produced using a policy network (e.g., the policy network 610 in FIG. 6). At block 815, a top portion of the set of candidate dropout policies is selected based on short-term rewards (e.g., the short-term rewards 704 in FIG. 7). At block 820, one dropout policy is selected from the top portion of the set of candidate dropout policies based on long-term rewards (e.g., the long-term rewards 706 in FIG. 7).

Figure 9:
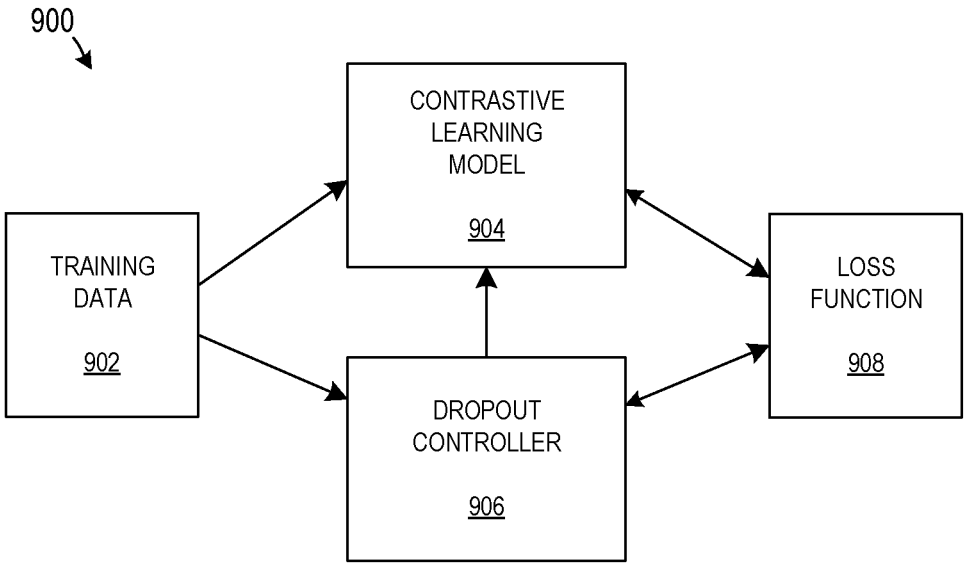
FIG. 9 is a block diagram illustration of a system for contrastive learning that selects a dropout policy based on reinforcement learning in accordance with aspects of the present disclosure.

FIG. 9 is a block diagram illustration of a system 900 for contrastive learning by selecting a dropout policy based on reinforcement learning. The system 900 includes training data 902, a contrastive learning model 904, a dropout controller 906, and a loss function 908. In an embodiment, the same training data 902 and the same loss function 908 are used for selecting a dropout policy by the dropout controller 906 and for training the contrastive learning model 904.

Figure 10:
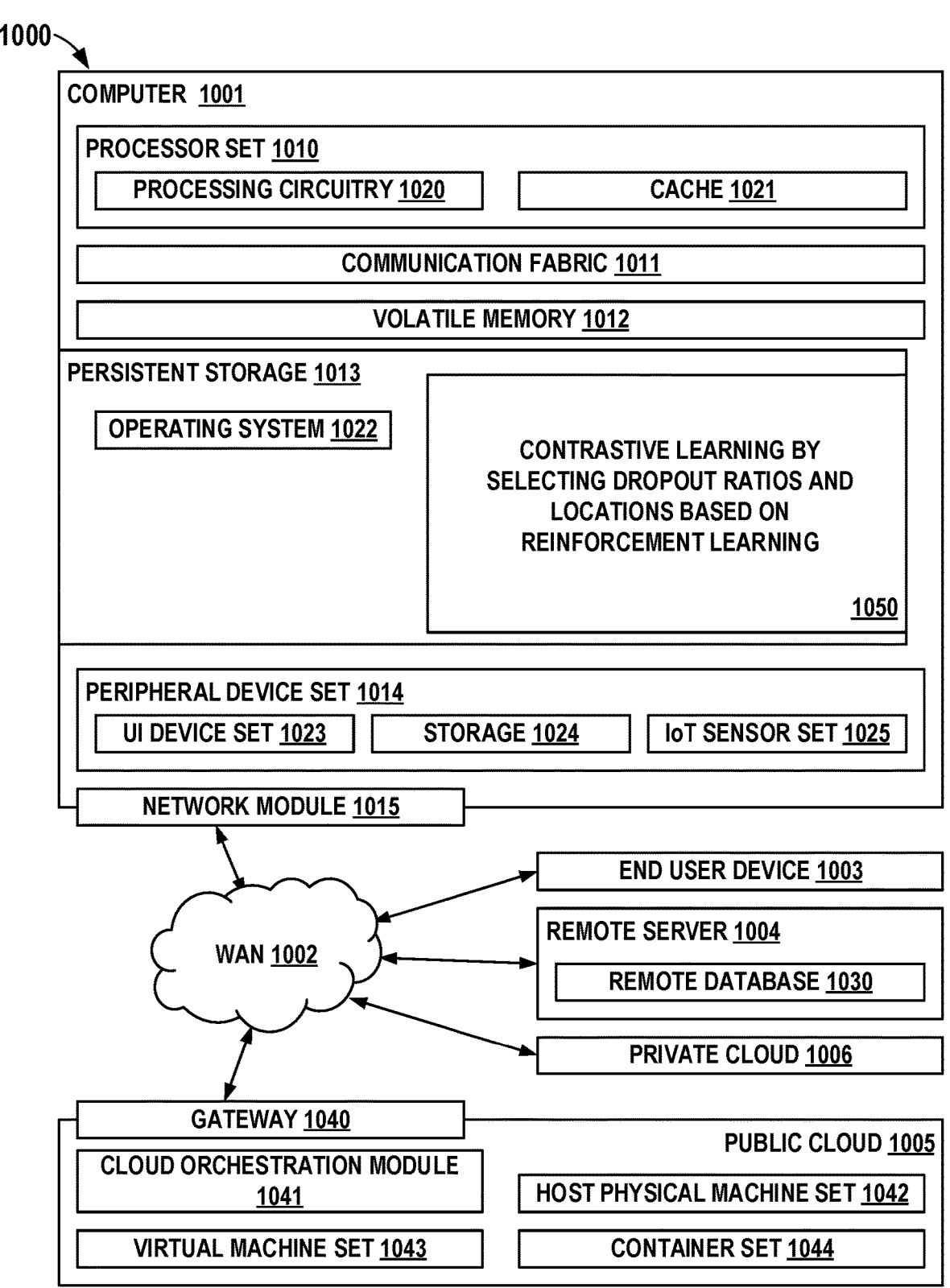
FIG. 10 is a block diagram illustration of a hardware architecture of a data processing system in accordance with aspects of the present disclosure.

FIG. 10 is a block diagram illustration of a hardware architecture of a computing environment 1000 in accordance with aspects of the present disclosure. Computing environment 1000 contains an example of an environment for the execution of at least some of the computer code involved in performing the inventive methods, such as contrastive learning by selecting dropout ratios and locations based on reinforcement learning module 1050. In addition to module 1050, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and module 1050, as identified above), peripheral device set 1014 (including user interface (UI) device set 423, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in module 1050 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The code included in module 1050 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, user interface (UI) device set 423 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. Internet of Things (IoT) sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

receiving, by a processor, training data comprising a positive sample corresponding to a target and negative samples not corresponding to the target;

producing, by a dropout controller and based on the training data, a dropout policy for a neural network, wherein the dropout policy identifies at least one connection between neurons in the neural network to dropout, wherein producing the dropout policy further comprises, producing, by a policy network and based on the training data, a set of dropout policies corresponding to different dropout policies, selecting, by the dropout controller and based on a short-term reward, a portion of the set of dropout policies, and selecting, by the dropout controller and based on a long-term reward, one policy from the portion of the set of dropout policies as the dropout policy; and encoding, by an encoder and based on the dropout policy, the training data to form embeddings, wherein the embeddings comprise multiple positive sample embeddings corresponding to the positive sample and multiple negative sample embeddings corresponding to the negative samples, and wherein the embeddings are generated based on the dropout policy.

2. The method of claim 1, wherein producing the dropout policy comprises:

representing connections between the neurons in the neural network with dropout matrices; and selecting, based on a reinforcement learning method, one or more of the connections to disconnect to produce the dropout policy.

3. The method of claim 2, wherein representing the connections comprises producing N−1 dropout matrices, wherein N comprises any number and corresponds to a number of layers in the neural network, and wherein dimensions of each of the N−1 dropout matrices correspond to a number of neurons in adjacent layers in the neural network.

4. The method of claim 1, further comprising calculating both the short-term reward and the long-term reward using a same loss function.

5. The method of claim 1, wherein selecting the one policy comprises comparing policies within the portion of the set of dropout policies using a Monte Carlo search tree.

6. The method of claim 1, wherein producing the dropout policy comprises producing the dropout policy using transformer networks, wherein the transformer networks comprise a current network, a history network, and a composite network, wherein the current network comprises current parameter information of the current network, wherein the history network comprises previous parameter information of previous networks, and wherein the composite network is configured to merge the current parameter information with the previous parameter information to produce composite parameter information.

7. A system, comprising:

a non-transitory computer-readable storage memory configured to store instructions; and a processor coupled to the non-transitory computer-readable storage memory and configured to execute the instructions to cause the system to:

receive, by the processor, training data comprising a positive sample corresponding to a target and negative samples not corresponding to the target;

produce, by a dropout controller and based on the training data, a dropout policy for a neural network, wherein the dropout policy identifies at least one connection between neurons in the neural network to dropout, wherein producing the dropout policy further comprises, produce, by a policy network and based on the training data, a set of dropout policies corresponding to different dropout policies, select, by the dropout controller and based on a short-term reward, a portion of the set of dropout policies, and select, by the dropout controller and based on a long-term reward, one policy from the portion of the set of dropout policies as the dropout policy; and encode, by an encoder and based on the dropout policy, the training data to form embeddings, wherein the embeddings comprise multiple positive sample embeddings corresponding to the positive sample and multiple negative sample embeddings corresponding to the negative samples, and wherein the embeddings are generated based on the dropout policy.

8. The system of claim 7, wherein the processor is further configured to execute the instructions to cause the system to:

represent connections between the neurons in the neural network with dropout matrices; and select, based on a reinforcement learning method, one or more of the connections to disconnect to produce the dropout policy.

9. The system of claim 8, wherein the processor is further configured to execute the instructions to cause the system to produce N−1 dropout matrices, wherein N comprises any number and corresponds to a number of layers in the neural network, and wherein dimensions of each of the N−1 dropout matrices correspond to a number of neurons in adjacent layers in the neural network.

10. The system of claim 7, wherein the processor is further configured to execute the instructions to cause the system to calculate both the short-term reward and the long-term reward using a same loss function.

11. The system of claim 7, wherein the processor is further configured to execute the instructions to cause the system to compare policies within the portion of the set of dropout policies using a Monte Carlo search tree.

12. The system of claim 7, wherein the processor is further configured to execute the instructions to cause the system to produce the dropout policy using transformer networks, wherein the transformer networks comprise a current network, a history network, and a composite network, wherein the current network comprises current parameter information of the current network, wherein the history network comprises previous parameter information of previous networks, and wherein the composite network is configured to merge the current parameter information with the previous parameter information to produce composite parameter information.

13. A computer program product comprising instructions stored on a non-transitory computer-readable medium that, when executed by a processor, cause a system to:

receive, by the processor, training data comprising a positive sample corresponding to a target and negative samples not corresponding to the target;

produce, by a dropout controller and based on the training data, a dropout policy for a neural network, wherein the dropout policy identifies at least one connection between neurons in the neural network to dropout, wherein producing the dropout policy further comprises, produce, by a policy network and based on the training data, a set of dropout policies corresponding to different dropout policies, select, by the dropout controller and based on a short-term reward, a portion of the set of dropout policies, and select, by the dropout controller and based on a long-term reward, one policy from the portion of the set of dropout policies as the dropout policy; and encode, by an encoder and based on the dropout policy, the training data to form embeddings, wherein the embeddings comprise multiple positive sample embeddings corresponding to the positive sample and multiple negative sample embeddings corresponding to the negative samples, and wherein the embeddings are generated based on the dropout policy.

14. The computer program product of claim 13, wherein the instructions further cause the system to:

represent connections between the neurons in the neural network with dropout matrices; and select, based on a reinforcement learning method, one or more of the connections to disconnect to produce the dropout policy.

15. The computer program product of claim 14, wherein the instructions further cause the system to produce N−1 dropout matrices, wherein N comprises any number and corresponds to a number of layers in the neural network, and wherein dimensions of each of the N−1 dropout matrices correspond to a number of neurons in adjacent layers in the neural network.

16. The computer program product of claim 13, wherein the instructions further cause the system to calculate both the short-term reward and the long-term reward using a same loss function.

17. The computer program product of claim 13, wherein the instructions further cause the system to compare policies within the portion of the set of dropout policies using a Monte Carlo search tree.

\* \* \* \* \*